(12) United States Patent
Solmeyer (10) Patent No.: US 12,493,087 B2
(45) Date of Patent: Dec. 9, 2025

(54) VERTICAL CAVITY SURFACE-EMITTING LASER THRESHOLD MAGNETOMETER

(71) Applicant: Honeywell International Inc., Charlotte, NC (US)

(72) Inventor: Neal Eldrich Solmeyer, Edina, MN (US)

(73) Assignee: Honeywell International Inc., Charlotte, NC (US)

( * ) Notice: Subject to any disclaimer, the term of this patent is extended or adjusted under 35 U.S.C. 154(b) by 183 days.

(21) Appl. No.: 18/391,111

(22) Filed: Dec. 20, 2023

(65) Prior Publication Data

US 2025/0208237 A1   Jun. 26, 2025

(51) Int. Cl.
*G01R 33/032* (2006.01)

(52) U.S. Cl.
CPC .................. *G01R 33/032* (2013.01)

(58) Field of Classification Search
CPC ...... G01R 33/02; G01R 33/032; G01R 33/26; G01R 31/2607; G01R 31/2632; G01R 31/2635; H01S 5/0014; H01S 5/005
See application file for complete search history.

(56) References Cited

U.S. PATENT DOCUMENTS

| | | | |
|---|---|---|---|
| 6,594,300 B2 | 7/2003 | Wipiejewski | |
| 7,043,117 B2 | 5/2006 | Matsko et al. | |
| 7,266,258 B2 | 9/2007 | Liu et al. | |
| 8,138,756 B2 | 3/2012 | Barclay et al. | |
| 8,836,327 B2 | 9/2014 | French et al. | |
| 9,726,733 B2 | 8/2017 | Smith et al. | |
| 9,910,105 B2 | 3/2018 | Boesch et al. | |
| 10,042,009 B2 | 8/2018 | Lindorfer et al. | |
| 10,082,545 B2 | 9/2018 | Jeske et al. | |
| 10,114,083 B2 | 10/2018 | Forstner et al. | |
| 10,126,377 B2 | 11/2018 | Hahn et al. | |
| 10,317,279 B2 | 6/2019 | Bruce et al. | |

(Continued)

FOREIGN PATENT DOCUMENTS

| | | |
|---|---|---|
| CN | 104198967 A | 12/2014 |
| CN | 113568246 A | 10/2021 |

(Continued)

OTHER PUBLICATIONS

U.S. Patent and Trademark Office, "Notice of Allowance", U.S. Appl. No. 18/053,535, dated Sep. 5, 2024, pp. 1 through 28, Published: US.

(Continued)

*Primary Examiner* — Huy Q Phan
*Assistant Examiner* — David B Frederiksen
(74) *Attorney, Agent, or Firm* — Fogg & Powers LLC (57) ABSTRACT

A threshold magnetometer includes a vertical cavity surface-emitting laser with a first material that is disposed in one of the layers. The first material is configured as an absorbent material or emission material to light propagating in the optical resonator. As an absorbent material, the first material absorbs light when exposed to radio frequency (RF) radiation at one or more resonant frequencies. As an emission material, the first material intensifies light when exposed to RF radiation at one or more resonant frequencies. The resultant intensity change can be detected and used to determine characteristics of an external magnetic field.

20 Claims, 5 Drawing Sheets

(56) References Cited

U.S. PATENT DOCUMENTS

| | | |
|---|---|---|
| 10,330,744 B2 | 6/2019 | Luzod |
| 10,371,765 B2 | 8/2019 | Kaup et al. |
| 10,571,269 B1 | 2/2020 | Solmeyer et al. |
| 10,677,953 B2 | 6/2020 | Stetson et al. |
| 10,901,054 B1 | 1/2021 | Chen et al. |
| 10,928,200 B1 | 2/2021 | Wu et al. |
| 11,119,163 B2 | 9/2021 | Puckett et al. |
| 11,131,619 B2 | 9/2021 | Ozdemir et al. |
| 11,199,733 B2 | 12/2021 | Puckett et al. |
| 11,300,639 B2 | 4/2022 | Solmeyer et al. |
| 11,563,306 B2 | 1/2023 | Moench et al. |
| 11,733,321 B2 | 8/2023 | Rosenfeld |
| 2003/0185514 A1 | 10/2003 | Bendett et al. |
| 2006/0251136 A1* | 11/2006 | Lee .................. H01S 5/183 372/99 |
| 2013/0265042 A1 | 10/2013 | Kawabata et al. |
| 2014/0354275 A1 | 12/2014 | Sheng et al. |
| 2016/0134078 A1 | 5/2016 | Gaeta et al. |
| 2016/0231394 A1 | 8/2016 | Manickam et al. |
| 2016/0356863 A1 | 12/2016 | Boesch et al. |
| 2017/0023487 A1 | 1/2017 | Boesch |
| 2017/0343621 A1 | 11/2017 | Hahn et al. |
| 2018/0275210 A1 | 9/2018 | Luzod |
| 2019/0018076 A1 | 1/2019 | Hahn et al. |
| 2019/0018087 A1 | 1/2019 | Hahn et al. |
| 2019/0219645 A1 | 7/2019 | Hahn et al. |
| 2020/0018802 A1 | 1/2020 | Palacios Laloy et al. |
| 2020/0153195 A1* | 5/2020 | Kupcho ............ H01S 5/0014 |
| 2020/0192007 A1 | 6/2020 | Kwak et al. |
| 2020/0350106 A1* | 11/2020 | Alford .................. H01F 5/003 |
| 2020/0403378 A1 | 12/2020 | Fujii et al. |
| 2021/0103010 A1 | 4/2021 | Rosenfeld |
| 2021/0103166 A1 | 4/2021 | Puckett et al. |
| 2021/0132163 A1 | 5/2021 | Puckett et al. |
| 2022/0121084 A1 | 4/2022 | Bowers et al. |
| 2022/0128407 A1 | 4/2022 | Lee et al. |
| 2022/0307997 A1 | 9/2022 | Meijer et al. |
| 2022/0397429 A1 | 12/2022 | Burchard et al. |
| 2023/0349989 A1 | 11/2023 | Burchard et al. |

FOREIGN PATENT DOCUMENTS

| | | |
|---|---|---|
| DE | 102019203930 A1 | 9/2020 |
| DE | 102020004617 A1 | 1/2021 |
| EP | 3248021 A1 | 11/2017 |
| GB | 2408796 A | 6/2005 |
| JP | 6142025 B2 | 6/2017 |
| WO | 2007049260 A1 | 5/2007 |
| WO | 2019002576 A1 | 1/2019 |

OTHER PUBLICATIONS

Bougas et al., "On the Possibility of Miniature Diamond-Based Magnetometers Using Waveguide Geometries", Micromachines 2018, 9, 276, Jun. 1, 2018, pp. 1 through 11, MDPI.

Dumeige, et al., "Infrared laser threshold magnetometry with a NV doped diamond intracavity etalon", Optics Express, vol. 27, No. 2, Jan. 21, 2019, pp. 1706 through 1717.

Hausmann et al., "An on-chip diamond optical parametric oscillator", arXiv:1309.1178v1, [physics.optics], Sep. 4, 2013, pp. 1 through 7.

Wu et al., "Coupled Cavity Magnetometer", U.S. Appl. No. 18/165,891, filed Feb. 7, 2023, pp. 1 through 27.

Jensen et al., "Cavity-Enhanced Room-Temperature Magnetometry Using Absorption by Nitrogen-Vacancy Centers in Diamond", Physical Review Letters, Apr. 23, 2014, vol. 112, Issue 16, pp. 160802-1 through 160802-5, (c) 2014 American Physical Society.

Knauer et al., "Structured Polymer Waveguides on Distributed Bragg Reflector Coupling to Solid State Emitter", Journal of Optics 19(6), [065203]. 2017, https://doi.org/10.1088/2040/8986/aa6a70, Page(s) Cover pages through 9.

Puckett et al., "Integrated Photonics Magnetometer Based on a Nonlinear Diamond-Containing Resonator", U.S. Appl. No. 18/053,535, filed Nov. 8, 2022, pp. 1 through 37.

Sergaeva, et al., Resonant Dielectric Waveguide-Based Nanostructure for Efficient Interation With Color Centers in Nanodiamonds, Nanosystems: Physics, Chemistry, Mathematics, 2019, 10 (3), PACS 42.25.Fx, 42.79.e, 42.82 Gw, DOI 10.17586/2220-8054-2019-10-3-266-272, pp. 266-272.

U.S. Patent and Trademark Office, "Corrected Notice of Allowability", U.S. Appl. No. 16/786,495, filed May 14, 2021, pp. 1 through 6, Published: US.

U.S. Patent and Trademark Office, "Notice of Allowance", U.S. Appl. No. 16/786,495, filed Apr. 30, 2021, pp. 1 through 18, Published: US.

U.S. Patent and Trademark Office, "Notice of Allowance", U.S. Appl. No. 16/788,819, Aug. 18, 2021, pp. 1 through 9, Published: US.

U.S. Patent and Trademark Office, "Notice of Allowance", U.S. Appl. No. 17/027,450, filed Dec. 3, 2021, pp. 1 through 13, Published: US.

U.S. Patent and Trademark Office, "Office Action", U.S. Appl. No. 16/788,819, filed Apr. 13, 2021, pp. 1 through 10, Published: US.

* cited by examiner

VERTICAL CAVITY SURFACE-EMITTING LASER THRESHOLD MAGNETOMETER

BACKGROUND

A magnetometer is designed to determine the properties of an external magnetic field, and are valuable for inertial navigation assistance in aerial navigation. Magnetometers exist in many forms, one of which is a threshold magnetometer. These magnetometers utilize a resonator cavity to amplify light from a probe light source, for example, a probe laser. Whereas conventional laser physics applications typically seek to maximize gain of the output signal through resonance, a threshold magnetometer induces absorption or emission in the cavity using magnetically sensitive defects to enhance the contrast of the measurement when the cavity is near threshold. In a threshold magnetometer, the properties of a magnetic field are determined by observing the power extrema at the output of the resonator cavity. A small change in the absorption or emission in the cavity can drive it above or below threshold, so that the output power of the resonator has a strong non-linear dependence on the absorption, which ultimately determines the presence of a magnetic field from the resonant frequencies of the resonator.

Threshold magnetometers currently operate utilizing free space optics. Fabrication of these magnetometers can be bulky and expensive. Additionally, such sensors are prone to external biases, particularly for navigation use where the environmental properties (temperature, pressure, humidity, vibrations, etc.) may drastically change from one location to the next.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a threshold magnetometer is disclosed. The threshold magnetometer comprises a probe light source configured to generate probe light. The threshold magnetometer comprises a vertical cavity surface-emitting laser (VCSEL) comprising the probe light source or optically coupled to an output of the probe light source. The VCSEL comprises a first layer comprising at least one first reflecting or scattering element configured to receive the probe light. The VCSEL comprises a third layer comprising at least one second reflecting or scattering element configured to reflect or scatter the probe light and to pass output light generated from the probe light at an intensity. The at least one first reflecting or scattering element and the at least one second reflecting or scattering element are optically coupled to form an optical resonator. The VCSEL comprises a second layer in between the at least one first reflecting or scattering element and the at least one second reflecting or scattering element. The second layer comprises a first material disposed in the optical resonator. The first material, in response to optical contact from pump light at an excitation frequency of the first material, absorbs or intensifies light propagating in the optical resonator. The intensity of the output light changes in response to the intensifying or absorption of the light propagating in the optical resonator by the first material.

In another embodiment, a vertical cavity surface-emitting laser (VCSEL) is disclosed, the VCSEL configured for operation in a threshold magnetometer. The VCSEL comprises a probe light source configured to generate probe light. The VCSEL comprises a first layer comprising at least one first reflecting or scattering element configured to receive the probe light. The VCSEL comprises a third layer comprising at least one second reflecting or scattering element configured to reflect or scatter output light generated from the probe light at an intensity. The at least one first reflecting or scattering element and the at least one second reflecting or scattering element are optically coupled to form an optical resonator. The VCSEL comprises a second layer in between the at least one first reflecting or scattering element and the at least one second reflecting or scattering element. The second layer comprises a first material disposed in the optical resonator. The first material, in response to optical contact from light at an excitation frequency of the first material, intensifies or absorbs light propagating in the optical resonator. The intensity of the output light changes in response to the intensifying or absorption of the light propagating in the optical resonator by the first material.

In yet another embodiment, a method of operating a threshold magnetometer is disclosed. The threshold magnetometer comprises a vertical cavity surface-emitting laser (VCSEL). The method comprises receiving or generating probe light from a probe light source. The method comprises generating, from an optical resonator in the VCSEL, output light from the probe light, wherein the optical resonator comprises at least one first reflecting or scattering element disposed on a first layer of the VCSEL and at least one second reflecting or scattering element disposed on a third layer of the VCSEL. The method comprises receiving, at a first material disposed on a second layer of the VCSEL in the optical resonator, pump light at an excitation frequency of the first material. The first material is configured, in response to optical contact from the light at the excitation frequency, to intensify or absorb light propagating in the optical resonator. The method comprises receiving, at the first material disposed on the second layer of the VCSEL, radio frequency (RF) emission at a range of frequencies, wherein the range of frequencies includes at least one resonant frequency of the first material. The method comprises detecting, by a detector disposed on an end of the VCSEL, an intensity change of the output light in response to excitation of the first material from the pump light. The method comprises determining one or more characteristics of an external magnetic field based on the RF emission received at the first material in response to detecting the intensity change of the output light. Other embodiments are disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently described and in conjunction with the detailed description.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

Systems and methods for magnetometry are presented comprising a first material in an optical resonator of a vertical cavity surface-emitting laser (VCSEL). In exemplary embodiments, the first material is a diamond layer within the VCSEL stack with nitrogen vacancy centers. The first material can absorb or intensify light propagating within an optical resonator at one or more resonant frequencies, thereby reducing or increasing the output power level of the optical resonator. The absorption rate of the first material can be modified based on a range of frequencies emitted by a transmitter. Based on the transmission frequency at which the photons in the optical resonator are absorbed or intensified, one or more characteristics of a magnetic field can be determined. By including a first material in the optical resonator and measuring the output power, the nonlinear response of the cavity to a change in absorption or emission near threshold has a much larger effect on the output of the cavity than the single pass absorption/emission in the first material, allowing for a higher contrast measurement, and therefore higher sensitivity measurement. Also, the structured configuration of the VCSEL magnetometer as described herein reduces the size, weight, and power of conventional magnetometers so that many types of sensors can take advantage of the laser magnetometry techniques described herein.

Figure 1:
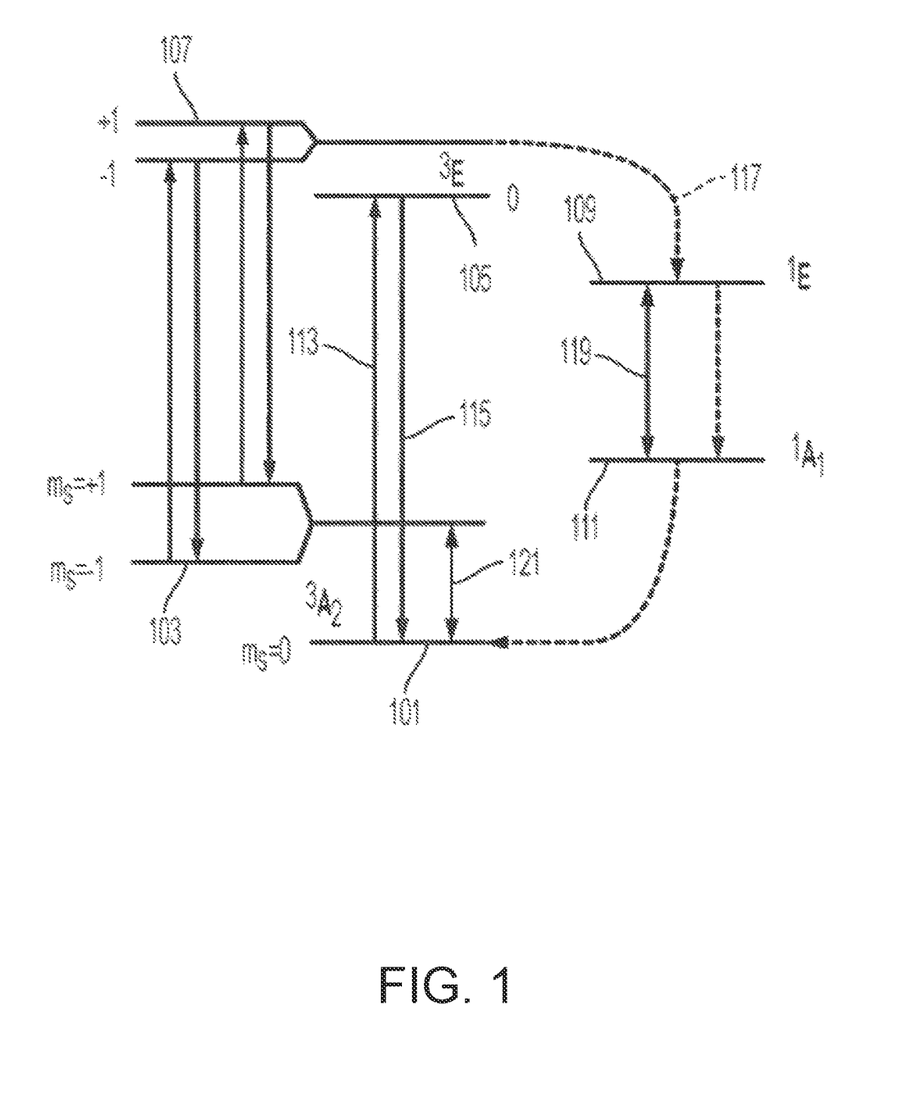
FIG. 1 depicts a diagram illustrating transitions between the various states of a first material used for fabricating a magnetometer.

FIG. 1 is a diagram illustrating transitions between the various states of an exemplary first material used for fabricating a magnetometer. For example, some materials have certain physical characteristics that allow the material to be responsive to magnetic fields. The first material may be a nitrogen vacancy (NV) diamond, silicon carbide with defect centers, or other material having addressable energy levels that are sensitive to a magnetic field. As used herein, NV diamond refers to a diamond-based material having multiple point defects where a point defect includes a nearest-neighbor pair of a nitrogen atom substituted for another atom (say, a carbon atom) and a lattice vacancy. Such a material can be fabricated as an absorbent layer 314 implemented in the VCSEL magnetometers described herein. The first material is described in the context of FIG. 1 as an absorbent material (i.e. a material that absorbs light) to illustrate the properties of the material. However, such properties can, in some embodiments, also classify the first material as an emission material (i.e. a material that generates or intensifies light), as further described in FIG. 3.

As illustrated, the first material may have a ground state that is a spin triplet state. The ground state may have multiple spin projections: a ground antiparallel 101 of spin projection 0 and ground parallel spins 103 with spin projections of +/−1, where the ground antiparallel spins 101 and the ground parallel spins 103 are separated by a resonant frequency 121. In the absence of a magnetic field, when the first material is NV diamond, the resonant frequency is approximately 2.87 GHz. Additionally, the point defects within the first material may be optically excited through spin conserving transitions to a spin triplet excited level, where the triplet excited level also has multiple spin projections: an excited antiparallel spin 105 of spin projection 0 and excited parallel spins 107 with spin projections of +/−1. To optically excite the point defects, the first material may be exposed to a pump light having a particular frequency. For example, in NV diamond, laser light having a wavelength of 532 nm may cause spin conserving transitions from the ground triplet state to the excited triplet states.

When the point defects within the first material are at the excited state, the defects relax either through a radiative transition 115 or through an intersystem crossing 117. When the point defects relax through a radiative transition 115, the point defects fluoresce and return to the ground triplet states. For example, NV diamond point defects generally emit light having a wavelength of 637 nm during radiative transitions 115. When a point defect relaxes through an intersystem crossing 117, the point defect will not fluoresce and will transition to a shelved state, where the shelved state is a shelved ground state 111 or a shelved excited state 109. Additionally, when the point defects are in one of the shelved states 109 and 111, the point defects absorb probe light 119 having a particular frequency. For example, NV diamond point defects in the shelved states 109 and 111 absorb probe light 119 having a wavelength of 1042 nm.

In some implementations, a low-energy radiation field is applied to the first material to increase the rate of intersystem crossings 117. Such a low energy radiation field can include light at a frequency range in the radio frequency (RF) range of the electromagnetic spectrum. As used herein, RF light also includes light in the microwave range of the electromagnetic spectrum, and microwave light is described as a particular example of the RF spectrum. For a NV diamond material, a microwave frequency resonant with the transition 121 is applied to the first material to increase the rate of intersystem crossings 117 as compared to radiative transitions 115. In the first material, non-radiative intersystem crossings 117 may be strongly spin selective. For example, point defects having parallel spins 107 are more likely to experience an intersystem crossing 117 to the shelved states 109 and 111. In contrast, point defects having excited antiparallel spins 105 are more likely to experience a radiative transition back to the ground triplet state. To increase the probability of intersystem crossings, a microwave frequency is applied to the first material equal to the resonant frequency for the first material. For example, when the first material is NV diamond (resonant frequency approximately 2.87 GHz), applying a frequency of 2.87 GHz to the first material will increase the probability of intersystem crossings 117 to the shelved states 109 and 111.

Additionally, when a microwave signal at the resonant frequency is applied to the first material, the probe light 119 is more likely to be absorbed by the first material as the population of point defects at the shelved states 109 and 111 within the first material is greater than when the first material is not exposed to the energy at the resonant frequency. Accordingly, when the probe light 119 is applied to the first material in the absence of the microwave signal at the resonant frequency, the probe light 119 is not absorbed by the first material as efficiently. For example, when a NV diamond material is exposed to a microwave signal having a frequency of 2.87 GHZ, the NV diamond material begins to absorb probe light 119 having a wavelength of 1042 nm at an increased rate.

In some implementations, the resonant frequency for the first material changes in the presence of a magnetic field. For example, when the first material is exposed to a magnetic field, the Zeeman effect causes the resonant frequency to experience a shift in proportion to the strength of the experienced magnetic field. In the presence of a magnetic field, the resonance frequency splits into two different resonant frequencies, where the difference between the two resonant frequencies is proportional to the applied magnetic field. This splitting behavior is depicted in the ms=+1 and ms=−1 states of level 103 in FIG. 1. Accordingly, the resonant frequency at which the probe light 119 is absorbed by point defects in the first material can be monitored to determine the strength of a magnetic field experienced by the first material.

In some implementations, the point defects within the first material are in one of multiple different orientations. For example, when the first material is NV diamond, each point defect can be in one of four different orientations. The first material can have many point defects in each of the four different orientations. Accordingly, vector information for a magnetic field is extracted from the first material when probe light 119 is applied to the first material. For example, when the first material is exposed to a magnetic field, the resonant frequencies for a point defect shift based on the orientation of the point defect in relation to the experienced magnetic field. When the point defects in the first material are in multiple different orientations, the point defects in the first material have separate resonant frequencies associated with each of the different orientations of the point defects. Therefore, characteristics such as the vector information for the magnetic field is determined by identifying which resonances correspond to the different orientations of the point defects in the first material. In some implementations, biased magnetic fields are applied to the first material to aid in determining which resonance frequencies are associated with particular orientations of the point defects.

Figure 3:
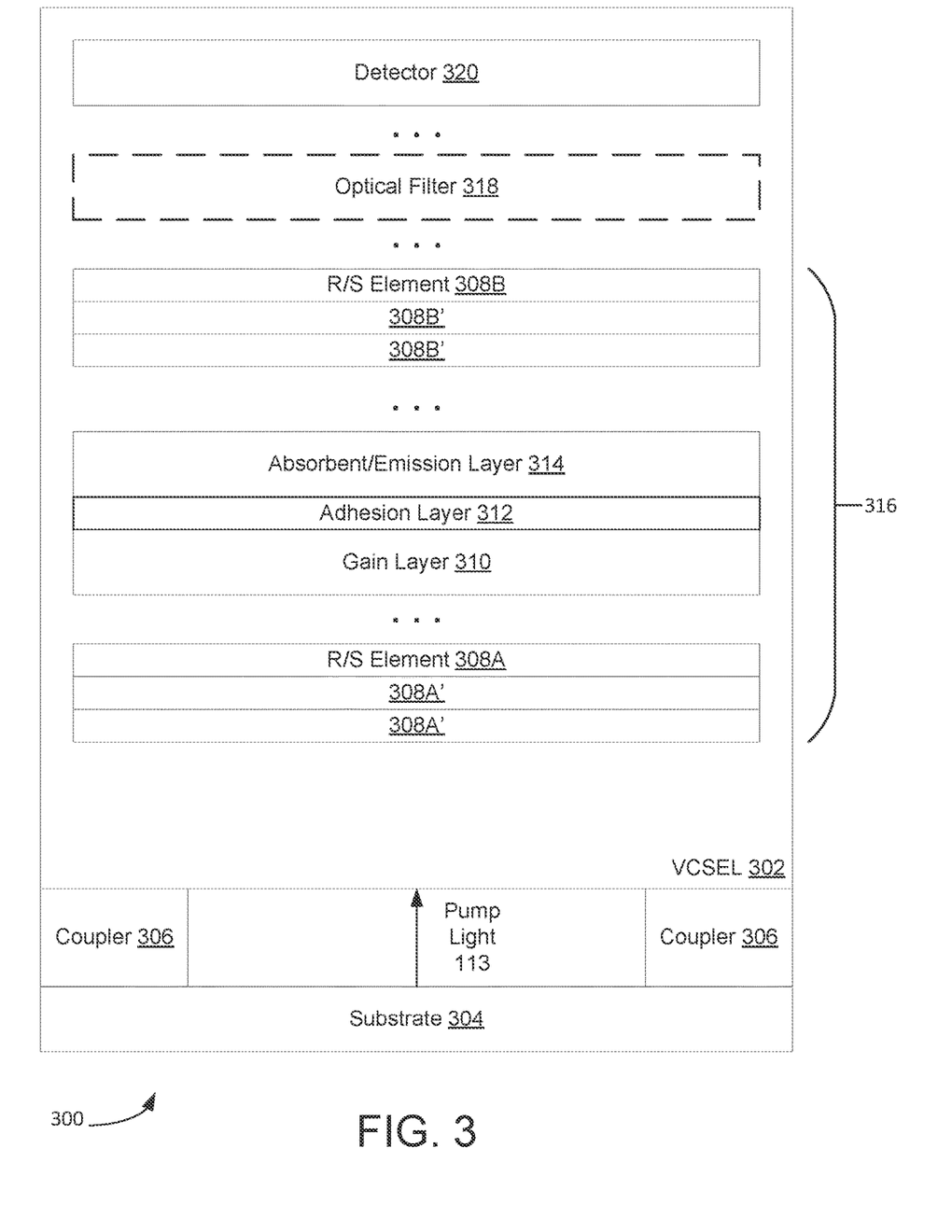
FIG. 3 depicts a block diagram of a vertical cavity surface-emitting laser, as described in one or more embodiments.

In the examples described herein, the first material is incorporated within a magnetometer that exposes the first material to a pump light 113 to cause the point defects within the first material to move to the excited triplet state. The magnetometer may also expose the first material to RF energy in a range of frequencies that includes the resonant frequency 121 for the first material, where a probability of intersystem crossings 117 to shelved states 109 and 111 increases at the resonant frequency 121 as described above. Additionally, the first material is exposed to probe light 119 (e.g., by a gain material disposed in the VCSEL 302), where the probe light 119 is absorbed by point defects in the shelved states 109 and 111. Accordingly, an applied microwave signal is swept through a range of frequencies to identify the resonant frequenc(ies) associated with the different orientations of the point defects within the first material. The resonant frequencies may be identified when the intensity of the applied probe light 119 that passes through the first material decreases, indicating that the applied probe light 119 was absorbed by the point defects within the first material. Based on the identified resonant frequencies, a magnetic field experienced by the first material may be calculated with high sensitivity to magnetic field changes; low size, weight, and power; and a robustness that could enable the use of a resulting magnetometer in many magnetic based or aided applications such as in navigation.

Figure 2:
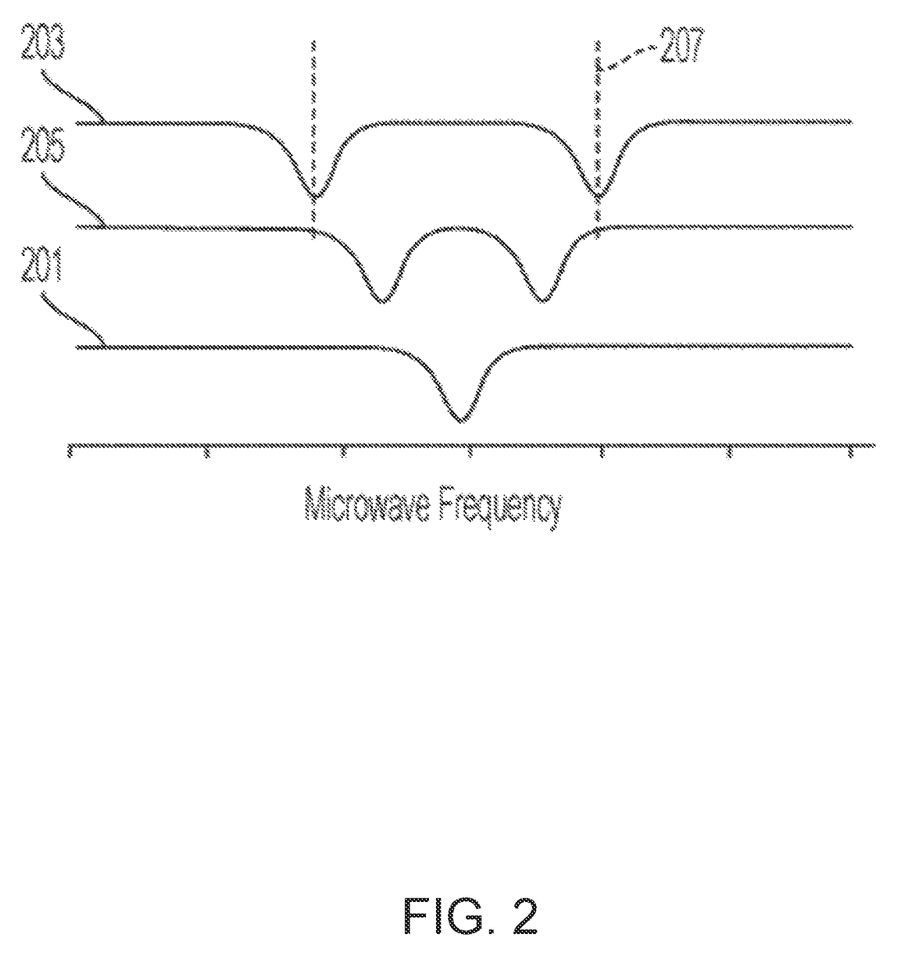
FIG. 2 depicts a graph illustrating the detection of an external magnetic field based on the identification of resonance lines in an applied RF and/or microwave field.

FIG. 2 is a graph illustrating the detection of a magnetic field based on the identification of resonance lines in an applied microwave field that is swept through a range of frequencies. As previously described, a first material may be exposed to a range of microwave frequencies, where the range of applied frequencies includes the different resonant frequenc(ies) for the first material. Additionally, the different resonant frequencies are associated with the strength of the magnetic fields experienced by the first material. The first material may also have different resonant frequencies associated with the different orientations of point defects within the first material.

As illustrated, FIG. 2 shows various graphs of the intensity of a probe laser as emitted from the first material at different microwave frequencies applied to the first material for three different magnetic field strengths. Intensity curve 201 shows the intensity of the emitted probe source at different frequencies when the first material is not exposed to a magnetic field. When light from a probe source (e.g., gain layer 310) is coupled into the first material in the absence of an applied magnetic field, the first material will not experience a Zeeman resonance shift and the probe light 119 will be absorbed at the single resonant frequency for the first material. Accordingly, the intensity 201 of the output light may decrease at the single resonant frequency for the first material.

But when the first material is exposed to different magnetic field strengths, the resonant frequency may experience a frequency shift in proportion to the experienced magnetic field strength. For example, intensity curve 205 and intensity curve 203 illustrate an intensity of the emitted probe light 119 by the first material in the presence of different magnetic field strengths. For example, the magnetic field strength experienced by the first material associated with intensity curve 203 is greater than the magnetic field strength experienced by the first material described by intensity curve 205. Accordingly, the magnitude of the shift of the resonant frequencies is greater when the first material is exposed to a greater magnetic field strength. To identify the magnitude of the shift of the resonant frequency, a system (e.g., processing system 410) identifies the frequencies 207 associated with significant changes in the intensity of the probe light 119 emitted by the first material. Based on the magnitude of the shift of the resonant frequency, a system determines the magnetic field experienced by a point defect. Additionally, when there are multiple resonant frequencies, the system may identify the orientations of the point defects associated with the different resonant frequencies and the direction of the experienced magnetic field.

FIG. 3 depicts a block diagram of a system 300 that can be implemented as part of a threshold magnetometer. System 300 includes a VCSEL 302 coupled to one or more substrates 304 via one or more couplers 306 (two of which are shown in FIG. 3). Couplers 306 can be any kind of coupler that attaches VCSEL 302 to substrate 304. Substrate 304 can be any composed of any suitable material configured for integrated photonics application, and may include waveguides or other optics disposed on or embedded in substrate 304. For example, substrate 304 can include a pump light source such as a laser that emits pump light 113 into the VCSEL 302 (and can be disposed in the VCSEL 302 as well). Substrate 304, and system 300 more generally can be implemented as part of an integrated photonics circuit. In some implementations, the integrated photonics circuit is an integrated photonics chip fabricated on the micron level scale.

VCSEL 302 is composed of a series of layered elements stacked vertically to one another. Each layer includes an optical material or component and is optically coupled with respect to each layer. In embodiments with an external pump source, VCSEL 302 is configured to receive the pump light 113 through one or more optical ports that couple VCSEL 302 to substrate 304.

In the VCSEL 302, an optical resonator (OR, see FIG. 4) 316 is disposed between one or more of the stacked vertical layers. In the embodiment shown in FIG. 3, optical resonator 316 is formed by disposing at least one first reflecting or scattering (R/S) element 308A in at least one layer that is vertically stacked with at least one second R/S element 308B in at least one layer. In this illustrated embodiment, the at least one first R/S element 308A is depicted as a set of three vertically stacked elements comprising element 308A directly coupled to additional elements 308A'. At least one second R/S element 308B is similarly depicted; however, any number of elements 308A', 308B' can be used. In some embodiments, each element in the set is disposed on its own distinct layer in the VCSEL 302.

The plurality of R/S elements 308A, 308B, are optically coupled to achieve resonance for the probe light 119. In some embodiments, R/S element 308A and R/S element 308B comprise a set of distributed Bragg reflectors. In one example, Bragg reflectors 308A, 308B (or other reflecting elements) reflect entering or propagating probe light 119 between the resonator 316 cavity. In other embodiments, scattering elements 308A 308B are used to scatter the probe light 119 between the cavity walls of the optical resonator 316. Pump light 113 can also enter and pass through the optical resonator 316.

Inside the optical resonator 316 is a gain layer 310 disposed in between the layers comprising the R/S element(s) 308A and the layers comprising the R/S element(s) 308B. Gain layer 310 acts as the gain medium for the optical resonator 316 and the VCSEL 302 more generally, and is configured to amplify the intensity of the probe light 119 entering or propagating into the VCSEL 302. In some embodiments, gain layer 310 comprises a material composed of indium arsenide (InAs), gallium arsenide (GaAs), or a chemical composition thereof. For example, the gain layer 310 can include InAs/GaAs quantum dots and/or GaInAs/GaAs quantum wells fabricated by optically pumping the gain medium.

In some embodiments, gain layer 310 is configured to undergo a nonlinear photon generation process to generate light having a different frequency from the frequency of the entering or propagating probe light 119 into VCSEL 302. In these embodiments, gain layer 310 includes nonlinear optical properties that may depend on the intensity of the probe light 119. When the intensity of the probe light 119 increases above a threshold power level, the high intensity of the probe light 119 triggers the nonlinear optical properties of the gain layer 310 and causes the gain layer 310 to generate photons that satisfy the resonance condition of the optical resonator 316. Various nonlinear photon generation processes can be used, such as stimulated Brillouin scattering (SBS), optical frequency comb formation, or others, to excite the entering probe light 119. Each nonlinear photon generation process may correlate with a different threshold power level that triggers the desired nonlinear properties of the optical resonator 316. In the case of SBS, a single additional wavelength greater than that of the probe light 119 will be produced, and in the case of optical frequency comb generation, many periodically spaced wavelengths will be produced. So long as the intensity of the light remains at the threshold power level, optical resonator 316 continues to generate output light at a frequency different than the frequency of the probe light 119.

Figure 4:
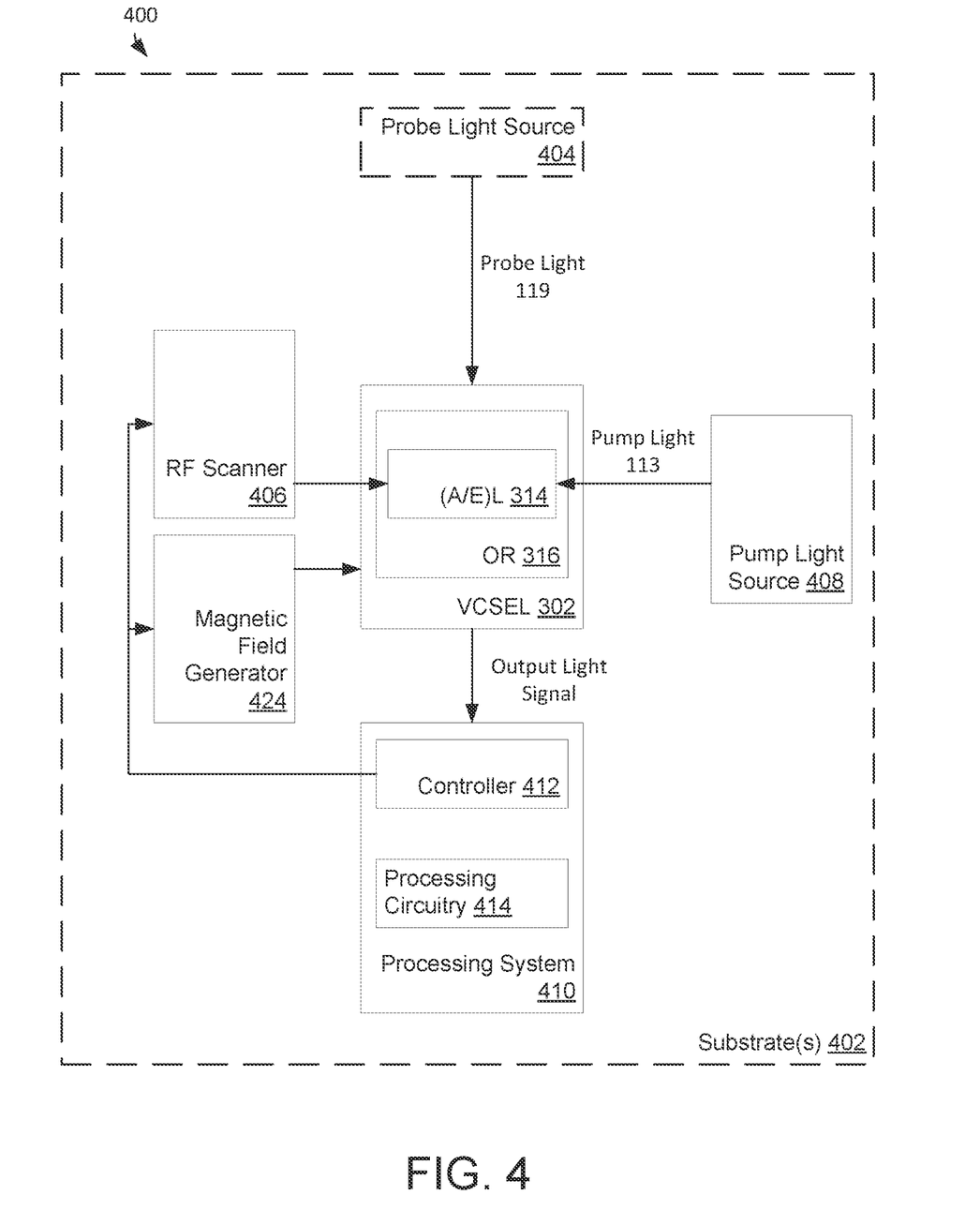
FIG. 4 depicts a block diagram of an exemplary magnetometer, as described in one or more embodiments.

Absorbent/Emission layer ((A/E) L, see FIG. 4) 314 is also disposed inside the optical resonator 316 and comprises the first material previously described in conjunction with FIGS. 1-2. As previously noted, absorbent layer 314 can include a material composed of NV diamond. In some embodiments, the first material is an absorbent material that causes the absorbent/emission layer 314 to act as an absorbent layer 314. In these embodiments, absorbent layer 314 absorbs the probe light 119 propagating in the optical resonator 316 when excited. In the absence of an external magnetic field, absorbent layer 314 absorbs probe light 119 at a single resonant frequency, but depending on the composition and orientation of the point defects in the absorbent layer 314, can absorb probe light 119 at multiple resonant frequencies when exposed to an external magnetic field. In some embodiments, the gain layer 310 is coupled to an absorbent layer 314 via a thin adhesion layer 312.

The absorbent layer 314 can also possess nonlinear optical characteristics, such as a nonlinear optical susceptibility, that triggers upon exciting the absorbent layer 314 to an excited state. In an excited state, absorbent layer 314 absorbs the probe light 119 propagating in optical resonator 316, thereby decreasing the intensity of the probe light 119 in the VCSEL 302. Doing so causes the power level of the probe light 119 to fall below the threshold power level needed for the gain layer 310 to undergo the nonlinear photon generation process previously described (in embodiments where gain layer 310 is configured to do so). As a result, gain layer 310 is no longer able to generate photons in this manner, and the output light of optical resonator 316 noticeably decreases in intensity.

Some of the output light can pass through the optical resonator 316 (at least when not impeded by absorbent layer 314) to an optional optical filter 318, disposed on a stacked layer above the optical resonator 316. In some embodiments, optical filter 318 is configured to filter out the pump light 113 used to excite the absorbent layer 314 from the output light from the optical resonator 316 so that only the probe light 119 passes through the optical filter 318. The filtered output light is then collected at a detector 320, which can be a photodiode or other optical detector. When absorbent layer 314 is excited, detector 320 detects little to no output light for each RF and/or microwave signal radiated to the absorbent layer 314 that corresponds to a resonant frequency of the point defects in the absorbent layer 314. In the presence of an external magnetic field, detector 320 perceives a minimum probe intensity at the output of the optical resonator 316 for multiple resonant frequencies corresponding to the Zeeman shift of the resonant frequency of the point defects. In the absence of an external magnetic field, detector 320 will detect an intensity minimum corresponding to the single resonant frequency of a point defect in the excited absorbent layer 314, and will detect an intensity maximum when the absorbent layer 314 is not absorbing the probe light 119.

The layered sequence of the components shown in VCSEL 302 can change depending on the embodiment. For example, additional layers with additional optics disposed thereon can be present in optical resonator 316 between the R/S elements 308A, 308B, and the absorbent layer 314 in the resonator cavity. Additionally, the order of the absorbent layer 314 and gain layer 310 can be modified in the optical resonator 316. In one embodiment, absorbent layer 314 is disposed on a stacked layer below the gain layer 310.

Further embodiments to the design of the VCSEL 302 can be made. Whereas in FIG. 3 the absorbent layer 314 and gain layer 310 are composed of distinct materials and disposed on different stacked layers of VCSEL 302, in some embodiments, absorbent layer 314 is also configured to act as a gain medium for the probe light 119. In this stimulated emission scheme, an absorbent layer 314 comprising a gain medium is disposed on at least one stacked layer in the optical resonator 316. When its absorbent properties are not triggered (e.g., when not excited by pump light 113), absorbent layer 314 amplifies the probe light 119 entering the optical resonator 316 and detector 320 detects an intensity maximum for the output light. Then, when triggered by pump light 113, the absorbent layer begins absorbing the intensity of the probe light 119 when subjected to an RF and/or microwave signal at the resonant frequenc(ies) of the point defects.

In another stimulated emission scheme, the first material is configured not as a light absorber but as a light intensifier. Similarly as previously described, the first material is disposed on an emission layer 314. When the first material is not excited by the pump light 113, the probe light 119 amplified by gain layer 310 exits the optical resonator 316 at a first intensity. Once the first material becomes excited by the pump light 113, emission layer 314 further amplifies the probe light 119 to a higher intensity that is detected by the detector 320. The detection of the higher intensity can be used as a measurement event to determine the resonant frequencies that correspond to the high intensity output analogous to the absorption scheme previously described.

Still referring to FIG. 3, the VCSEL 302 can be fabricated based on the following exemplary technique. First, a first material is prepared with point defects. This first material can then be constructed via polishing or ion splicing into a thin horizontal film (e.g., approximately 1 micron thickness) that forms the absorbent/emission layer 314, depending on the properties of the first material as an absorbent or emission material. The adhesion layer 312 is grown on one side of the absorbent/emission layer 314, followed by growth of the gain layer 310 on the adhesion layer 312. The layer complex comprising the absorbent/emission layer 314, adhesion layer 312, and gain layer 310 can then be deposited onto a suitable VCSEL substrate. On either side of the layer complex, the R/S elements 308A, 308B are deposited onto the VCSEL substrate to form the optical resonator 316. When implemented, optical filter 318 is then deposited above R/S element 308B. The detector 320 can then be deposited on a top layer of the VCSEL 302.

FIG. 4 depicts a block diagram of an exemplary threshold magnetometer 400 that includes the VCSEL 302 described in conjunction with FIG. 3. Magnetometer 400 is implemented on one or more substrate(s) 402, such as an integrated photonics chip. Disposed on the substrate 402 is VCSEL 302, which is optically coupled to optional probe light source 404, pump light source 408, RF scanner 406, magnetic field generator 424, and processing system 410.

In some embodiments, probe light source 404 is configured to generate the probe light 119 entering the VCSEL 302. In some embodiments, probe light source 404 is a laser source that generates probe light 119 at a wavelength of 710 nm or 1042 nm, depending on the properties of the absorbent layer 314. However, an external probe light source 404 is optional since the probe light 119 can also be generated inside the optical resonator 316. Pump light source 408 is configured to generate the pump light 113 that excites the absorbent/emission layer 314, which as an example, can be 532 nm light for an NV diamond. An RF scanner 406 radiates the sweeping RF field to the absorbent/emission layer 314 near the resonant frequency of the first material disposed on the absorbent/emission layer 314. Since the resonant frequency may be shifted, RF scanner 406 radiates the RF field in a range of frequencies with suitable sensitivity to include each shifted resonant frequency induced by an external magnetic field. Magnetic field generator 424 is configured to generate a biased magnetic field to the VCSEL 302 to assist in detecting the resonant frequency shifts experienced by the point defects of the absorbent/emission layer 314 from an external magnetic field. Such a biased magnetic field can be generated by one or more magnetic coils.

Processing system 410 is coupled to the output of VCSEL 302 and is configured to determine one or more characteristics of an external magnetic field based on the intensity of the output light. For example, processing system 410 includes processing circuitry 414 that receives the electrical output light signal from detector 320 signifying the intensity of the probe light 119. When the output signal indicates that an intensity extremum at the output of the VCSEL 302 has been observed, processing system 410 uses the corresponding frequencies emitted by RF scanner 406 (indicative of the shifted resonance frequencies of the absorbent layer 314) to determine the magnetic field characteristics, including the strength and vector orientation of the field components relative to an inertial reference frame. Processing system 410 also includes a controller 412, which can output control signals to RF scanner 406 (e.g., to control the range of frequency scanning to the VCSEL 302) and to magnetic field generator 424 (e.g., to control the biased magnetic field to the VCSEL 302).

Processing circuitry 414 and controller 412 may include any one or combination of processors, microprocessors, digital signal processors, application specific integrated circuits, field programmable gate arrays, and/or other similar variants thereof. Processing system 410 and its associated components may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Figure 5:
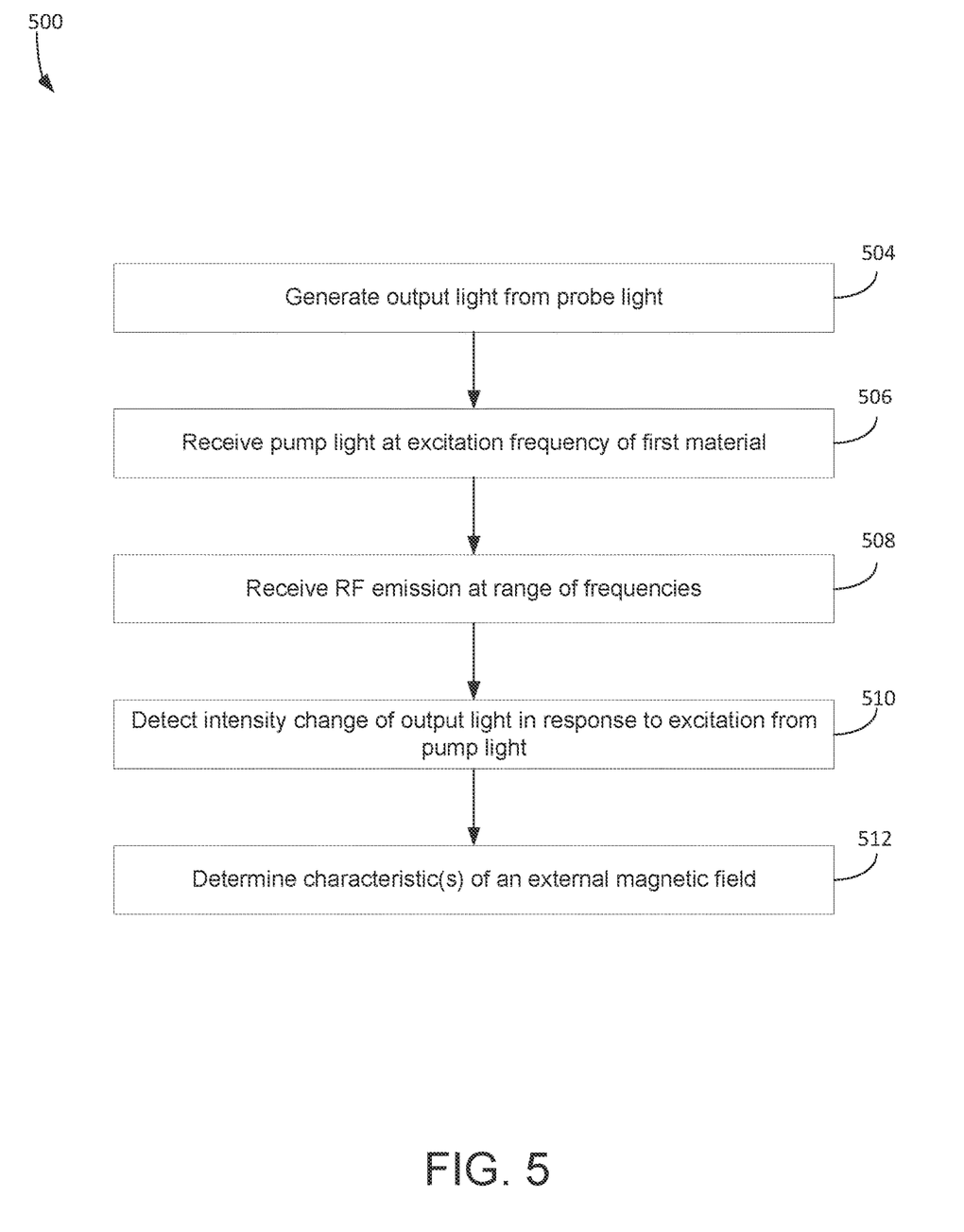
FIG. 5 depicts a flow diagram of a method for operating a threshold magnetometer, as described in one or more embodiments.

FIG. 5 depicts a flow diagram of a method 500 for operating a threshold magnetometer. Method 500 may be implemented via the techniques described with respect to FIGS. 1-4, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 500 includes generating output light from probe light at block 504. In some embodiments, the probe light 119 is received from a probe light source 404 external to the VCSEL 302 through an optical port. Alternatively, VCSEL 302 includes a probe light source 404 disposed on a layer in the VCSEL 302 which generates the probe light 119. In some embodiments, the optical resonator 316 disposed on one or more layers of the VCSEL 302 includes a gain layer 310 that amplifies the probe light 119 and outputs the probe light 119 from the optical resonator 316. In other embodiments, the gain layer 310 undergoes a nonlinear photon generation process to generate output light at a second frequency different from the frequency of the probe light 119.

Proceeding to block 506, method 500 receives pump light at an excitation frequency of the first material disposed in the VCSEL 302, such as NV diamond. The first material is fabricated into an absorbent/emission layer 314 and disposed into the optical resonator 316 of VCSEL 302, depending on the optical properties of the first material as a light absorber or light intensifier. Also, at block 508, method 500 receives radio frequency emission from an RF scanner 406. The radio frequency emission is radiated from RF scanner 406 from a range of frequencies, where one or more frequencies are the resonant frequency of the point defects of the absorbent/emission layer 314. Where an external magnetic field is present, there may be additional resonant frequencies resulting from the Zeeman splitting of the spin states of the point defects in the absorbent layer/emission 314.

Method 500 then proceeds to block 510 and detects an intensity change of the output light in response to the excitation from the pump light. In one embodiment, the VCSEL 302 includes a detector 320 that collects the output light from optical resonator 316. When the intensity of the output light falls below a threshold value, a processing system uses the frequenc(ies) from the RF scanner 406 associated with the resulting decrease in intensity to determine one or more characteristics of an external magnetic field experienced by the magnetometer at block 512. Such characteristics can include vector information and magnitude of the magnetic field. Alternatively, when the first material is used as an emitter, a processing system uses the frequencies from the RF scanner 406 associated with an intensity spike to determine characteristics of an external magnetic field.

The methods and techniques described herein may be implemented at least in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a threshold magnetometer, comprising: a probe light source configured to generate probe light; and a vertical cavity surface-emitting laser (VCSEL) comprising the probe light source or optically coupled to an output of the probe light source, the VCSEL comprising: a first layer comprising at least one first reflecting or scattering element configured to receive the probe light, a third layer comprising at least one second reflecting or scattering element configured to reflect or scatter the probe light and to pass output light generated from the probe light at an intensity, wherein the at least one first reflecting or scattering element and the at least one second reflecting or scattering element are optically coupled to form an optical resonator, a second layer in between the at least one first reflecting or scattering element and the at least one second reflecting or scattering element, the second layer comprising a first material disposed in the optical resonator, wherein the first material, in response to optical contact from pump light at an excitation frequency of the first material, absorbs or intensifies light propagating in the optical resonator, wherein the intensity of the output light changes in response to the intensifying or absorption of the light propagating in the optical resonator by the first material.

Example 2 includes the threshold magnetometer of Example 1, further comprising a detector coupled to the optical resonator, wherein the detector is configured to receive the output light and to detect a change in the intensity of the output light; and at least one processor coupled to the detector, wherein the at least one processor is configured to determine one or more characteristics of an external magnetic field in response to the detection of the change in the intensity of the output light.

Example 3 includes the threshold magnetometer of any of Examples 1-2, further comprising a radio frequency (RF) scanner, wherein the RF scanner is configured to radiate an RF field to the first material, wherein the RF field includes a range of frequencies that includes at least one resonant frequency associated with the first material, wherein in response to receiving the RF field at the at least one resonant frequency, the first material is configured to intensify or absorb the light propagating in the optical resonator.

Example 4 includes the threshold magnetometer of any of Examples 1-3, further comprising a pump light source, wherein the pump light source is configured to generate the light at the excitation frequency of the first material.

Example 5 includes the threshold magnetometer of any of Examples 2-4, further comprising a magnetic field generator, wherein the magnetic field generator is configured to radiate a bias magnetic field to the first material, wherein the at least one processor is configured to determine the one or more characteristics of the external magnetic field based on one or more characteristics of the bias magnetic field generated by the magnetic field generator.

Example 6 includes the threshold magnetometer of any of Examples 1-5, comprising a gain layer that includes a gain medium disposed in the optical resonator, wherein the gain medium amplifies the probe light in the optical resonator.

Example 7 includes the threshold magnetometer of any of Examples 1-6, wherein the probe light is generated at a first frequency and at a first intensity, wherein when the first intensity of the probe light exceeds a first power threshold, the optical resonator is configured to undergo a nonlinear photon generation process to generate light at a second frequency different from the first frequency, wherein the output light is at the second frequency, wherein the first material is configured, in response to receiving the light at the excitation frequency, to absorb the probe light at the first frequency, wherein the first material has a nonlinear optical susceptibility such that, by absorbing the probe light, the first material adjusts a threshold power level needed for the optical resonator to undergo the nonlinear photon generation process from the first power threshold to a second power threshold higher than the first power threshold, wherein when the intensity of the probe light at the first frequency is below the second power threshold, the optical resonator is not able to generate the output light at the second frequency, wherein the intensity of the output light decreases in response to the first intensity of the probe light being below the second power threshold.

Example 8 includes a vertical cavity surface-emitting laser (VCSEL) configured for operation in a threshold magnetometer, the VCSEL comprising: a probe light source configured to generate probe light; and a first layer comprising at least one first reflecting or scattering element configured to receive the probe light, a third layer comprising at least one second reflecting or scattering element configured to reflect or scatter output light generated from the probe light at an intensity, wherein the at least one first reflecting or scattering element and the at least one second reflecting or scattering element are optically coupled to form an optical resonator, a second layer in between the at least one first reflecting or scattering element and the at least one second reflecting or scattering element, the second layer comprising a first material disposed in the optical resonator, wherein the first material, in response to optical contact from light at an excitation frequency of the first material, intensifies or absorbs light propagating in the optical resonator, wherein the intensity of the output light changes in response to the intensifying or absorption of the light propagating in the optical resonator by the first material.

Example 9 includes the VCSEL of Example 8, further comprising a detector disposed on an end of the VCSEL, wherein the detector is configured to receive the output light and to detect a change in the intensity of the output light, wherein the detector is configured to generate a signal to at least one processor indicating that the change in the intensity of the output light has been detected.

Example 10 includes the VCSEL of any of Examples 8-9, further comprising an optical filter disposed on a fourth layer of the VCSEL, wherein the optical filter is configured to filter out the probe light from the output light.

Example 11 includes the VCSEL of any of Examples 8-10, wherein the at least one first reflecting or scattering element and the at least one second reflecting or scattering element comprise a series of distributed Bragg reflectors.

Example 12 includes the VCSEL of any of Examples 8-11, further comprising a gain layer comprising a gain medium, wherein the gain medium is configured to amplify an intensity of the light propagating in the optical resonator.

Example 13 includes the VCSEL of Example 12, further comprising an adhesion layer that couples the gain layer to the second layer in the optical resonator.

Example 14 includes the VCSEL of any of Examples 8-13, wherein the probe light is generated at a first frequency and at a first intensity, wherein when the first intensity of the probe light exceeds a first power threshold, the optical resonator is configured to undergo a nonlinear photon generation process to generate light at a second frequency different from the first frequency, wherein the output light is at the second frequency, wherein the first material is configured, in response to receiving the light at the excitation frequency, to absorb the probe light at the first frequency, wherein the first material has a nonlinear optical susceptibility such that, by absorbing the probe light, the first material adjusts a threshold power level needed for the optical resonator to undergo the nonlinear photon generation process from the first power threshold to a second power threshold higher than the first power threshold, wherein when the intensity of the probe light at the first frequency is below the second power threshold, the optical resonator is not able to generate the output light at the second frequency, wherein the intensity of the output light decreases in response to the first intensity of the probe light being below the second power threshold.

Example 15 includes the VCSEL of any of Examples 8-14, wherein the second layer is composed of a nitrogen-vacancy (NV) diamond material comprising multiple point defects.

Example 16 includes a method for operating a threshold magnetometer, wherein the threshold magnetometer comprises a vertical cavity surface-emitting laser (VCSEL), the method comprising: receiving or generating probe light from a probe light source; generating, from an optical resonator in the VCSEL, output light from the probe light, wherein the optical resonator comprises at least one first reflecting or scattering element disposed on a first layer of the VCSEL and at least one second reflecting or scattering element disposed on a third layer of the VCSEL; receiving, at a first material disposed on a second layer of the VCSEL in the optical resonator, pump light at an excitation frequency of the first material, wherein the first material is configured, in response to optical contact from the light at the excitation frequency, to intensify or absorb light propagating in the optical resonator; receiving, at the first material disposed on the second layer of the VCSEL, radio frequency (RF) emission at a range of frequencies, wherein the range of frequencies includes at least one resonant frequency of the first material; detecting, by a detector disposed on an end of the VCSEL, an intensity change of the output light in response to excitation of the first material from the pump light; and determining one or more characteristics of an external magnetic field based on the RF emission received at the first material in response to detecting the intensity change of the output light.

Example 17 includes the method of Example 16, comprising filtering, by an optical filter disposed on a fourth layer of the VCSEL, the probe light from the output light output from the optical resonator.

Example 18 includes the method of any of Examples 16-17, comprising amplifying, by a gain medium disposed on a fifth layer of the VCSEL an intensity of the light propagating in the optical resonator, wherein the gain medium is coupled to the first material by an adhesion layer.

Example 19 includes the method of any of Examples 16-18, wherein the at least one first reflecting or scattering element and the at least one second reflecting or scattering element comprises a series of distributed Bragg reflectors.

Example 20 includes the method of any of Examples 16-19, wherein the second layer is composed of a nitrogen-vacancy (NV) diamond material comprising multiple point defects.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A threshold magnetometer, comprising:
    a probe light source configured to generate probe light; and
    a vertical cavity surface-emitting laser (VCSEL) comprising the probe light source or optically coupled to an output of the probe light source, the VCSEL comprising:
    a first layer comprising at least one first reflecting or scattering element configured to receive the probe light,
    a third layer comprising at least one second reflecting or scattering element configured to reflect or scatter the probe light and to pass output light generated from the probe light at an intensity, wherein the at least one first reflecting or scattering element and the at least one second reflecting or scattering element are optically coupled to form an optical resonator,
    a second layer in between the at least one first reflecting or scattering element and the at least one second reflecting or scattering element, the second layer comprising a first material disposed in the optical resonator, wherein the first material, in response to a optical contact from a pump light at an excitation frequency of the first material, absorbs or intensifies light propagating in the optical resonator,
    wherein the intensity of the output light changes in response to the intensifying or absorption of the light propagating in the optical resonator by the first material.

2. The threshold magnetometer of claim 1, further comprising a detector coupled to the optical resonator, wherein the detector is configured to receive the output light and to detect a change in the intensity of the output light; and
    at least one processor coupled to the detector, wherein the at least one processor is configured to determine one or more characteristics of an external magnetic field in response to the detection of the change in the intensity of the output light.

3. The threshold magnetometer of claim 2, further comprising a magnetic field generator, wherein the magnetic field generator is configured to radiate a bias magnetic field to the first material,
    wherein the at least one processor is configured to determine the one or more characteristics of the external magnetic field based on one or more characteristics of the bias magnetic field generated by the magnetic field generator.

4. The threshold magnetometer of claim 1, further comprising a radio frequency (RF) scanner, wherein the RF scanner is configured to radiate an RF field to the first material, wherein the RF field includes a range of frequencies that includes at least one resonant frequency associated with the first material,
    wherein in response to receiving the RF field at the at least one resonant frequency, the first material is configured to intensify or absorb the light propagating in the optical resonator.

5. The threshold magnetometer of claim 1, further comprising a pump light source, wherein the pump light source is configured to generate the light at the excitation frequency of the first material.

6. The threshold magnetometer of claim 1, comprising a gain layer that includes a gain medium disposed in the optical resonator, wherein the gain medium amplifies the probe light in the optical resonator.

7. The threshold magnetometer of claim 1, wherein the probe light is generated at a first frequency and at a first intensity,
    wherein when the first intensity of the probe light exceeds a first power threshold, the optical resonator is configured to undergo a nonlinear photon generation process to generate a light at a second frequency different from the first frequency, wherein the output light is at the second frequency,
    wherein the first material is configured, in response to receiving the light at the excitation frequency, to absorb the probe light at the first frequency, wherein the first material has a nonlinear optical susceptibility such that, by absorbing the probe light, the first material adjusts a threshold power level needed for the optical resonator to undergo the nonlinear photon generation process from the first power threshold to a second power threshold higher than the first power threshold,
    wherein when the intensity of the probe light at the first frequency is below the second power threshold, the optical resonator is not able to generate the output light at the second frequency,
    wherein the intensity of the output light decreases in response to the first intensity of the probe light being below the second power threshold.

8. A vertical cavity surface-emitting laser (VCSEL) configured for operation in a threshold magnetometer, the VCSEL comprising:
    a probe light source configured to generate probe light; and
    a first layer comprising at least one first reflecting or scattering element configured to receive the probe light,
    a third layer comprising at least one second reflecting or scattering element configured to reflect or scatter output light generated from the probe light at an intensity,
    wherein the at least one first reflecting or scattering element and the at least one second reflecting or scattering element are optically coupled to form an optical resonator,
    a second layer in between the at least one first reflecting or scattering element and the at least one second reflecting or scattering element, the second layer comprising a first material disposed in the optical resonator, wherein the first material, in response to a optical contact from a pump light at an excitation frequency of the first material, intensifies or absorbs a light propagating in the optical resonator,
    wherein the intensity of the output light changes in response to the intensifying or absorption of the light propagating in the optical resonator by the first material.

9. The VCSEL of claim 8, further comprising a detector disposed on an end of the VCSEL, wherein the detector is configured to receive the output light and to detect a change in the intensity of the output light, wherein the detector is configured to generate a signal to at least one processor indicating that the change in the intensity of the output light has been detected.

10. The VCSEL of claim 8, further comprising an optical filter disposed on a fourth layer of the VCSEL, wherein the optical filter is configured to filter out the probe light from the output light.

11. The VCSEL of claim 8, wherein the at least one first reflecting or scattering element and the at least one second reflecting or scattering element comprise a series of distributed Bragg reflectors.

12. The VCSEL of claim 8, further comprising a gain layer comprising a gain medium, wherein the gain medium is configured to amplify an intensity of the light propagating in the optical resonator.

13. The VCSEL of claim 12, further comprising an adhesion layer that couples the gain layer to the second layer in the optical resonator.

14. The VCSEL of claim 8, wherein the probe light is generated at a first frequency and at a first intensity,
wherein when the first intensity of the probe light exceeds a first power threshold, the optical resonator is configured to undergo a nonlinear photon generation process to generate a light at a second frequency different from the first frequency, wherein the output light is at the second frequency,
wherein the first material is configured, in response to receiving the pump light at the excitation frequency, to absorb the probe light at the first frequency, wherein the first material has a nonlinear optical susceptibility such that, by absorbing the probe light, the first material adjusts a threshold power level needed for the optical resonator to undergo the nonlinear photon generation process from the first power threshold to a second power threshold higher than the first power threshold,
wherein when the intensity of the probe light at the first frequency is below the second power threshold, the optical resonator is not able to generate the output light at the second frequency,
wherein the intensity of the output light decreases in response to the first intensity of the probe light being below the second power threshold.

15. The VCSEL of claim 8, wherein the second layer is composed of a nitrogen-vacancy (NV) diamond material comprising multiple point defects.

16. A method for operating a threshold magnetometer, wherein the threshold magnetometer comprises a vertical cavity surface-emitting laser (VCSEL), the method comprising:
receiving or generating a probe light from a probe light source;
generating, from an optical resonator in the VCSEL, a output light form the probe light, wherein the optical resonator comprises at least one first reflecting or scattering element disposed on a first layer of the VCSEL and at least one second reflecting or scattering element disposed on a third layer of the VCSEL;
receiving, at a first material disposed on a second layer of the VCSEL in the optical resonator, a pump light at an excitation frequency of the first material, wherein the first material is configured, in response to a optical contact from the pump light at the excitation frequency, to intensify or absorb a light propagating in the optical resonator;
receiving, at the first material disposed on the second layer of the VCSEL, a radio frequency (RF) emission at a range of frequencies, wherein the range of frequencies includes at least one resonant frequency of the first material;
detecting, by a detector disposed on an end of the VCSEL, an intensity change of the output light in response to excitation of the first material from the pump light; and
determining one or more characteristics of an external magnetic field based on the RF emission received at the first material in response to detecting the intensity change of the output light.

17. The method of claim 16, comprising filtering, by an optical filter disposed on a fourth layer of the VCSEL, the probe light from the output light output from the optical resonator.

18. The method of claim 16, comprising amplifying, by a gain medium disposed on a fifth layer of the VCSEL an intensity of the light propagating in the optical resonator, wherein the gain medium is coupled to the first material by an adhesion layer.

19. The method of claim 16, wherein the at least one first reflecting or scattering element and the at least one second reflecting or scattering element comprises a series of distributed Bragg reflectors.

20. The method of claim 16, wherein the second layer is composed of a nitrogen-vacancy (NV) diamond material comprising multiple point defects.

* * * * *